(12) United States Patent
Nusbickel

(10) Patent No.: US 8,140,695 B2
(45) Date of Patent: Mar. 20, 2012

(54) LOAD BALANCING AND FAILOVER OF DISTRIBUTED MEDIA RESOURCES IN A MEDIA SERVER

(75) Inventor: Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 11/164,932

(22) Filed: Dec. 12, 2005

(65) Prior Publication Data

US 2007/0136469 A1    Jun. 14, 2007

(51) Int. Cl.
    *G06F 15/16*    (2006.01)
(52) U.S. Cl. ......... 709/230; 709/223; 709/245; 370/352
(58) Field of Classification Search .................. 709/230
    See application file for complete search history.

(56) References Cited

U.S. PATENT DOCUMENTS

| | | | |
|---|---|---|---|
| 5,668,854 A | 9/1997 | Minakami et al. | |
| 5,878,117 A | 3/1999 | Minakami et al. | |
| 5,938,732 A | 8/1999 | Lim et al. | |
| 6,173,322 B1 * | 1/2001 | Hu | 709/224 |
| 6,182,139 B1 * | 1/2001 | Brendel | 709/226 |
| 6,236,999 B1 | 5/2001 | Jacobs et al. | |
| 6,327,622 B1 * | 12/2001 | Jindal et al. | 709/228 |
| 6,374,300 B2 * | 4/2002 | Masters | 709/229 |
| 6,427,002 B2 | 7/2002 | Campbell et al. | |
| 6,535,521 B1 | 3/2003 | Barghouti et al. | |
| 6,560,717 B1 | 5/2003 | Scott et al. | |
| 6,571,274 B1 | 5/2003 | Jacobs et al. | |
| 6,577,712 B2 | 6/2003 | Larsson et al. | |
| 6,587,866 B1 | 7/2003 | Modi et al. | |
| 6,697,858 B1 | 2/2004 | Ezerzer et al. | |
| 6,701,438 B1 | 3/2004 | Prabandham et al. | |
| 6,714,642 B2 | 3/2004 | Dhir et al. | |
| 6,782,418 B1 | 8/2004 | Cerrone et al. | |
| 6,785,649 B1 | 8/2004 | Hoory et al. | |

(Continued)

FOREIGN PATENT DOCUMENTS

CN    1494028    5/2004

(Continued)

OTHER PUBLICATIONS

Shanmugham et al. "A Media Resource Control Protocol Developed by Cisco, Nuance, and Speechworks" [Online]; Apr. 5, 2009 [Retrieved on Oct. 27, 2009]; Internet Engineering Task Force; [Retrieved from: http://tools.ietf.org/pdf/draft-shanmughan-mrcp-07.pdf].

(Continued)

*Primary Examiner* — Firmin Backer
*Assistant Examiner* — Hamza Algibhah
(74) *Attorney, Agent, or Firm* — Cuenot, Forsythe & Kim, LLC

(57) ABSTRACT

A method and a system for load balancing media resources among a plurality of servers. A first request can be received from a client requesting a first media processing resource, the request being formatted in accordance with a first protocol. The first request can be morphed into a first morphed request formatted in accordance with a second protocol. A first server that is least loaded can be selected from a first server partition including a plurality of servers, each of which provides the requested first media processing resource. The first morphed request can be forwarded to the first server in accordance with the second protocol.

20 Claims, 2 Drawing Sheets

U.S. PATENT DOCUMENTS

| | | | |
|---|---|---|---|
| 6,801,604 B2 | 10/2004 | Maes et al. | |
| 6,813,635 B1 | 11/2004 | Jorgenson | |
| 6,868,144 B2 | 3/2005 | Skladman | |
| 6,870,914 B1 | 3/2005 | Bossemeyer et al. | |
| 7,016,844 B2 | 3/2006 | Othmer et al. | |
| 7,062,556 B1* | 6/2006 | Chen et al. | 709/226 |
| 7,099,939 B2 | 8/2006 | von Klopp et al. | |
| 7,113,986 B2* | 9/2006 | Goldszmidt et al. | 709/223 |
| 7,552,225 B2* | 6/2009 | Creamer et al. | 709/230 |
| 2002/0049842 A1* | 4/2002 | Huetsch et al. | 709/225 |
| 2003/0014254 A1 | 1/2003 | Zhang et al. | |
| 2003/0131151 A1 | 7/2003 | Roach et al. | |
| 2004/0125794 A1* | 7/2004 | Marquette et al. | 370/355 |
| 2004/0138890 A1 | 7/2004 | Ferrans et al. | |
| 2004/0158608 A1* | 8/2004 | Friedman | 709/206 |
| 2004/0162880 A1* | 8/2004 | Arnone et al. | 709/206 |
| 2005/0021826 A1 | 1/2005 | Kumar | |
| 2005/0065790 A1 | 3/2005 | Yacoub | |
| 2005/0086355 A1* | 4/2005 | Deshpande | 709/231 |
| 2005/0102676 A1* | 5/2005 | Forrester | 718/105 |
| 2006/0026206 A1 | 2/2006 | Loghmani et al. | |
| 2006/0041431 A1* | 2/2006 | Maes | 704/270.1 |
| 2006/0071778 A1* | 4/2006 | Vesikivi et al. | 340/539.1 |
| 2006/0239249 A1* | 10/2006 | Banner et al. | 370/352 |
| 2006/0239257 A1* | 10/2006 | Banner et al. | 370/356 |
| 2007/0038697 A1* | 2/2007 | Zimran et al. | 709/203 |
| 2007/0043868 A1* | 2/2007 | Kumar et al. | 709/226 |
| 2007/0047719 A1* | 3/2007 | Dhawan et al. | 379/235 |
| 2007/0081520 A1* | 4/2007 | Da Palma et al. | 370/352 |
| 2007/0121596 A1* | 5/2007 | Kurapati et al. | 370/356 |
| 2007/0124431 A1* | 5/2007 | Sharma | 709/219 |
| 2007/0136414 A1 | 6/2007 | Nusbickel | |
| 2007/0185957 A1* | 8/2007 | Mandalia et al. | 709/204 |
| 2008/0312933 A1* | 12/2008 | Creamer et al. | 704/270.1 |

FOREIGN PATENT DOCUMENTS

| | | |
|---|---|---|
| EM | EP1122937 A2 | 8/2001 |
| JP | 2002269061 A | 9/2002 |
| JP | 2002318720 A | 10/2002 |

OTHER PUBLICATIONS

Shanmugham et al., "Media Resource Control Protocol Version 2 (MRCPv2)", IEF Standard Working Draft, Internet Engineering Task Force, IETF, Ch, vol. speechsc, No. 9 (Dec. 7, 2005).

Chamberlain, J., et al., "IBM WebSphere Voice Server V5.1.1/V5.1.2 and Avaya Interactive Response V1.3: An Interoperability Guide," [Online] IBM Corporation, Nov. 2005, [retrieved Dec. 8, 2011] retrieved from the Internet: <www.redbooks.ibm.com/redpapers/pdfs/redp3977.pdf>, 136 pgs.

* cited by examiner

US 8,140,695 B2

LOAD BALANCING AND FAILOVER OF DISTRIBUTED MEDIA RESOURCES IN A MEDIA SERVER

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to distributed resource management and, more particularly, to management of distributed media resources.

BACKGROUND OF THE INVENTION

Automatic speech recognizers (ASRs) and text to speech (TTS) synthesizers are speech resources commonly implemented in automated interactive systems, for example in automated voice response systems used in telephone call centers. ASRs and TTS synthesizers are resource consumptive, and oftentimes must be implemented across several machines that constitute a speech server solution. In order to reduce hardware costs, the speech resources are typically shared among many clients and allocated only when they are actually needed.

Media processing resource Control Protocol (MRCP) is a protocol that provides a mechanism for a client device requiring media processing resources, for example ASRs and TIS synthesizers, to control such resources on a network. In particular, MRCP defines requests, responses and events needed to control the media processing resources. Unfortunately, the MRCP standard exclusively relies on the client to distribute client requests. Indeed, MRCP lacks methods that can be implemented by a server to distribute the media processing resources across multiple nodes. Moreover, clients accessing resources may not have knowledge of which server resources are available and which server resources are currently being used. Accordingly, the most common form of load balancing is a method in which a client sequentially sends requests to various servers until a client session is established. Such a method, however, does not properly balance server loads, which reduces hardware efficiency.

SUMMARY OF THE INVENTION

The present invention relates to a method and a system for load balancing media resources among a plurality of servers. A first request can be received from a client device requesting a first processing resource, the first request being formatted in accordance with a Media Resource Control Protocol (MRCP). The first request can be morphed by translating the first request into a first morphed request formatted in accordance with a Hypertext Transfer Protocol (HTTP). A first server partition comprising a plurality of servers, each of which provides the requested first media processing resource, can be identified. From the first server partision, a first server that is least loaded can be selected. The first morphed request can be forwarded to the first server in accordance with the HTTP.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a method and a system which may be used for load balancing Media Resource Control Protocol (MRCP) resources among a plurality of servers. For example, an MRCP message requesting a media processing resource can be received over a TCP/IP socket by a protocol morpher/client, and morphed into a standard Hypertext Transfer Protocol (HTTP) message. The HTTP message then can be forwarded to a load balancer. From a set of servers, each of which provides the requested media processing resource, the load balancer can select a server that is least loaded and forward the morphed request to the selected server in accordance with the HTTP protocol. When a next request is received by the load balancer, the load balancer can again select a least loaded server from the set of servers and send the next request to that server. The server selected the second time may or may not be the same server that was previously selected.

Figure 1:
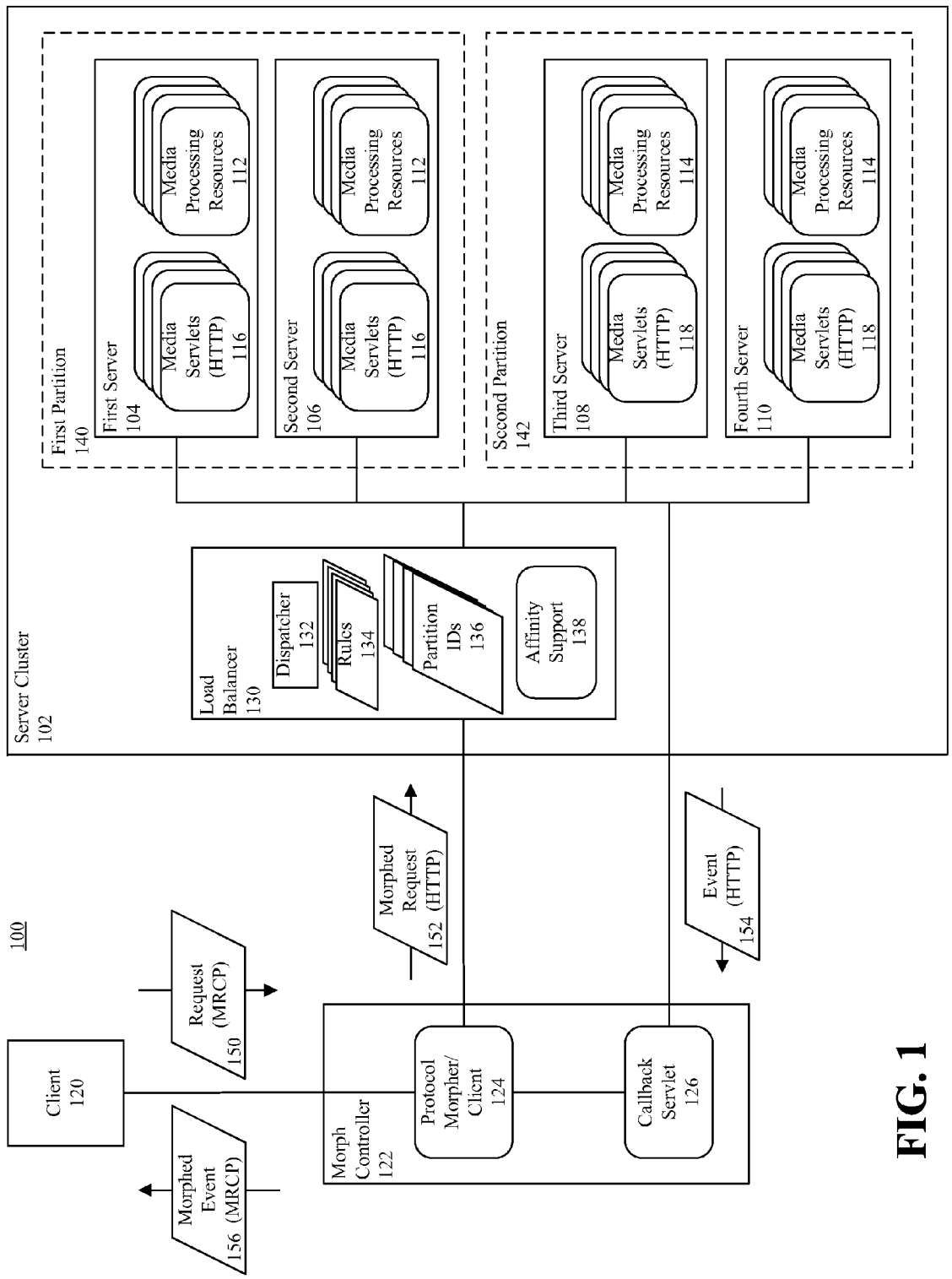
FIG. 1 is a block diagram illustrating a system in which media processing resources are load balanced in accordance with one embodiment of the present invention.

FIG. 1 is a block diagram illustrating a system 100 that includes a server cluster 102. The server cluster 102 can include a plurality of servers, for example a first server 104, a second server 106, a third server 108 and a fourth server 110. Each of the servers 104, 106, 108, 110 can be, for instance, protocol based servers, such as MRCP servers. The servers 104, 106, 108, 110 can be networked in any suitable manner. For example, the servers can be networked via a local area network (LAN), a wide area network (WAN), the Internet, or any other communications network.

Each of the servers 104, 106, 108, 110 can provide media processing resources. For instance, the first server 104 and the second server 106 each can provide a first set of media processing resources 112. Similarly, the third server 108 and the fourth server 110 can provide a second set of processing resources 114. The media processing resources 112, 114 can be automatic speech recognizers (ASRs), text to speech (TTS) synthesizers, speaker verifiers, dual tone multi-frequency (DTMF) recognizers, or any other resources that can process media requests. For example, the first set of media processing resources 112 can include text to speech (TTS) synthesizers that generate a female voice, and the second set of media processing resources 114 can include TTS synthesizers that produce a male voice.

The system 100 also can include a plurality of clients, such as client 120. The client 120 can be any device that can connect to the server cluster 102 over a network and to which the server cluster 102 provides media processing resources. For example, the client 120 can be a computer, a telephone, a mobile telephone, a personal digital assistant, a game console, an interactive appliance, or any other device which can access media processing resources provided by the server cluster 102 over a LAN, a WAN, the Internet, or any other communications network. Although one client 120 is shown, the system 100 can include any number of clients accessing the media processing resources 112, 114. Indeed, the methods described herein for distributing media processing resources 112, 114 facilitate simultaneous use of the media processing resources 112, 114 by multiple clients.

The client 120 can communicate with the server cluster 102 by propagating a first message, such as a request 150, to a morph controller 122 communicatively linked to the server cluster 102. The request 150 can be formatted in accordance with a suitable communications protocol. In addition, the client 120 can receive a second message, such as an event 156, in response to the first message. In one arrangement, the messages can be formatted, and communicated to between the client 120 and the morph controller 122, in accordance with MRCP.

To communicate messages in accordance with MRCP version 1, the client 120 can establish a user session with the morph controller 122 using a protocol such as the Real Time Streaming Protocol (RTSP), which operates over TCP/IP. Communicating messages in this manner is generally referred to as "tunneling". To communicate messages in accordance with MRCP version 2, the client 120 can establish a user session using the Session Initiation Protocol (SIP). In contrast to RTSP, after the SIP user session is established, messages are sent directly over TCP/IP instead of being tunneled.

The morph controller 122 can be realized in hardware, software, or a combination of hardware and software. The morph controller 122 also can be realized in a centralized fashion in one processing system or in a distributed fashion where different elements are spread across several interconnected processing systems. Although shown in FIG. 1 as a component distinct from the server cluster 102, the morph controller 122 also can be included as a component of the server cluster 102.

The morph controller 122 can comprise a protocol morpher/client 124 for receiving the request 150 and morphing the request into a morphed request 152. The morphed request 152 can be formatted in accordance with a protocol that is different than the protocol with which the original request 150 is formatted. For example, the protocol morpher/client 124 can morph the request 150 from an MRCP request into an HTTP request. To morph the request 150, MRCP specific code in the request can be replaced with correlating HTTP specific code. Table 1 below illustrates an example of code that can be contained in the request 150 prior to being morphed.

TABLE 1

| Request Example |
|---|
| ANNOUNCE rtsp://localhost/media/synthesizer RTSP/1.0 |
| CSeq: 1 |
| Session 1.IBM.9.22.74.38 |
| Date: Tue, 15 FEB 2005 11:28:01 est |
| Content-Type: application/mrcp |
| Content-Length: 149 |
| voice-name: Andrew |
| Content-Type: application/synthesis+ssml |
| Content-Length: 45 |
| <?xml version="1.0"?> |
| <speak>1 2 3 .</speak> |

In order to morph the request illustrated in Table 1, the protocol morpher/client 124 can change code in the RTSP portion of the message as follows:

```
replace
    "ANNOUNCE rtsp://localhost/media/synthesizer RTSP/1.0"
with
    "POST /synthesizerServlet HTTP 1.1"
    "Host: myserver.bocaraton.ibm.com"
    "user-agent=Java/1.4.1"
    "accept=text/html, image/gif, image/jpeg, *; q=.2, */*; q=.2"
    "connection=keep-alive".
```

In this arrangement, the MRCP portion of the message body can remain unchanged. Table 2 below illustrates an example of the morphed request 152 generated by morphing the first request 150 in this manner.

TABLE 2

| Morphed Request Example #1 |
|---|
| POST /synthesizerServlet HTTP 1.1 |
| Host: myserver.bocaraton.ibm.com |
| user-agent=Java/1.4.1 |
| accept=text/html, image/gif, image/jpeg, *; q=.2, */*; q=.2 |
| connection=keep-alive |
| CSeq: 1 |
| Session 1.IBM.9.22.74.38 |
| Date: Tue, 15 FEB 2005 11:28:01 est |
| Content-Type: application/mrcp |
| Content-Length: 149 |
| SPEAK 100 MRCP/1.0 |
| voice-name: Andrew |
| Content-Type: application/synthesis+ssml |
| Content-Length: 45 |
| <?xml version="1.0"?> |
| <speak>1 2 3 .</speak> |

In another arrangement the protocol morpher/client 124 can change code in the RTSP portion of the message as follows:

```
replace
    "ANNOUNCE rtsp://localhost/media/synthesizer RTSP/1.0"
with
    "POST /synthesizerServlet HTTP 1.1"
    "Host: myserver.bocaraton.ibm.com"
    "user-agent=Java/1.4.1"
    "accept=text/html, image/gif, image/jpeg, *; q=.2, */*; q=.2"
    "connection=keep-alive"
and remove
    "Content-Type: application/mrcp"
    "Content-Length: 149".
```

In this arrangement code in the MCRP portion of the message can be changed as follows:

---
replace
  "SPEAK 100 MRCP/1.0"
with
  "MRCPMethod: Speak"
---

Morphing the code in this manner combines the RTSP and MRCP messages, which changes "SPEAK 100" to an "MRCPMethod: Speak". In addition, the functionality of the content-type and content-length headers that are removed from the RTSP portion of the message can be handled by similar code already contained in the MRCP portion of the message. Table 3 below illustrates an example of the morphed request 152 generated by morphing the request 150 in accordance with this example.

TABLE 3

Request Example #2

POST /synthesizerServlet HTTP 1.1
Host: myserver.bocaraton.ibm.com
user-agent=Java/1.4.1
accept=text/html, image/gif, image/jpeg, *; q=.2, */*; q=.2
connection=keep-alive
CSeq: 1
Session 1.IBM.9.22.74.38
Date: Tue, 15 FEB 2005 11:28:01 est
MRCPMethod: Speak
voice-name: Andrew
Content-Type: application/synthesis+ssml
Content-Length: 45
<?xml version="1.0"?>
<speak>1 2 3 .</speak>

By reversing the process described above, the protocol morpher/client 124 also can morph an event 154 generated in response to the morphed request 152 into a morphed event 156 that is formatted in accordance with MRCP. For example, HTTP specific code in the first event 154 can be replaced with correlating MRCP specific code.

The protocol morpher/client 124 also can act as a client to the servers 104, 106, 108, 110. For example, the protocol morpher/client 124 can act as an HTTP client. In particular, the protocol morpher/client 124 can propagate the morphed request 152 to a load balancer 130. The load balancer 130 can include a dispatcher 132 that routes requests to the servers 104, 106, 108, 110. Specifically, the dispatcher 132 can route the morphed request 152 to a one of the servers 104, 106, 108, 110 which has media processing resources 112, 114 suitable for responding to the morphed request 152 and which is least loaded among the group of servers having such media processing resources 112, 114.

For example, the dispatcher 132 can apply resource selection rules 134 to the morphed request 152 to identify a partition of servers, such as a first partition 140 or a second partition 142, that are suitable for responding to the morphed request 152. For instance, the dispatcher 132 can apply the resource selection rules 134 to a pattern in the uniform resource identifier (URI) of the morphed request 152 and/or to a content-type header to identify suitable media processing resources 112, 114. The dispatcher 132 then can reference partition identifiers 136 to determine which partition, e.g. the first partition 140 or the second partition 142, comprises servers that provide the identified resources.

In a more specific example, the morphed request 152 can include a content-type header that contains "voice=Lisa" and "content type=TTS". Alternatively, an identifier that indicates "voice=Lisa" and "content type=TTS" can be contained in the URI of the morphed request 152. In response to receiving the morphed request 152, the dispatcher 132 can apply the resource selection rules 134 to determine that the type of media processing resource that provides the "Lisa" TTS is the media processing resource 112. The dispatcher 132 can reference the partition identifiers 136 to select the first partition 140 that includes the first server 104 and the second server 106. The dispatcher 132 then can reference a routing list containing routing information corresponding to each of the servers 104, 106, and query each of the servers 104, 106 to determine which server is least loaded.

If a particular server is no longer available, for instance the server has been taken off-line, that server can be removed from routing list. Accordingly, the dispatcher 152 can essentially ignore the off-line server. When the server comes back on-line, the server can again be added to the routing list. In this manner, the load balancer 130 also provides failover capability in addition to load balancing.

After determining which server is least loaded, the dispatcher 132 can forward the morphed request 152 to that server. For instance, if the first server 104 is least loaded, the dispatcher 132 can select the URI of the media processing resource 112 on the first server 104. The dispatcher 132 then can call the media servlet 116 on the first server 104 by sending the morphed request 152 to the media servlet 116. The media servlets 114, 116 can be HTTP servlets that are implemented with a suitable middleware platform that supports instantiating the servlets in a distributed fashion across a plurality of server nodes. One example of such as platform is J2EE, but the invention is not limited in this regard.

To achieve affinity with the selected media processing resource 104, the protocol morpher/client 120 can support the client session with cookies and/or uniform resource locator (URL) rewriting. The load balancer 130 also can include affinity support 138 to maintain affinity between the protocol morpher/client 120 and the media processing resource 104 while required. For example, the load balancer 130 can be configured to passively allow cookies to bypass load balancing routing for desired circumstances, for instance when modifying an outstanding request to a media processing resource. The affinity support also can be configured to obtain affinity to servers for the protocol morpher/client 120, where needed, by adding cookie affinity.

The media servlet 116 can parse the morphed request 152 and forward the parsed request 152 to the selected media processing resource 112. Information parsed from the morphed request 152 can include a URI of a callback servlet 126 to indicate that an event 154 generated by the media processing resource 112 in response to the morphed request 152 is to be forwarded to the callback servlet 126. The parsed information also can include a session identifier to indicate to which client 120 the event 154 is to be forwarded.

The callback servlet 126 can be communicatively linked to the protocol morpher/client 124. The callback servlet 126 can parse the session identifier from event 154 and forward the event 154 to the protocol morpher/client 124, indicating the appropriate client 120 to which the response 156 is to be forwarded. For example, the callback servlet 126 can provide the URL of the client 120. The protocol morpher/client 124 then can morph the event 154 into the morphed event 156 and forward the morphed event 156 to the client 120 in accordance with the first protocol. For example, the protocol morpher/client 124 can forward the morphed event 156 in accordance with MRCP.

When a second request is received from the client 120, or any other client, the process described above for the original request 150 can be repeated. If the second request requires the same media processing resources 112 as the first request, and the first server 104 is still least loaded, the morphed request can again be forwarded to the first server 104. If, however, the first server 104 is no longer the least loaded server in the first partition 140, another server that is least loaded can be selected. For instance, if the second server 106 now is the least loaded server in the first partition 140, the second server 106 can be selected and the second morphed request can be forwarded to it.

If the second request requires different media processing resources than the first request, such as media processing resources 114, the second morphed request can be forwarded to another server having the requested media processing resources 114, for instance the third server 108. The third server 108 can be selected from the second partition 142 over the fourth server 110 if the third server 108 is least loaded of the servers comprising the second partition 142.

Figure 2:
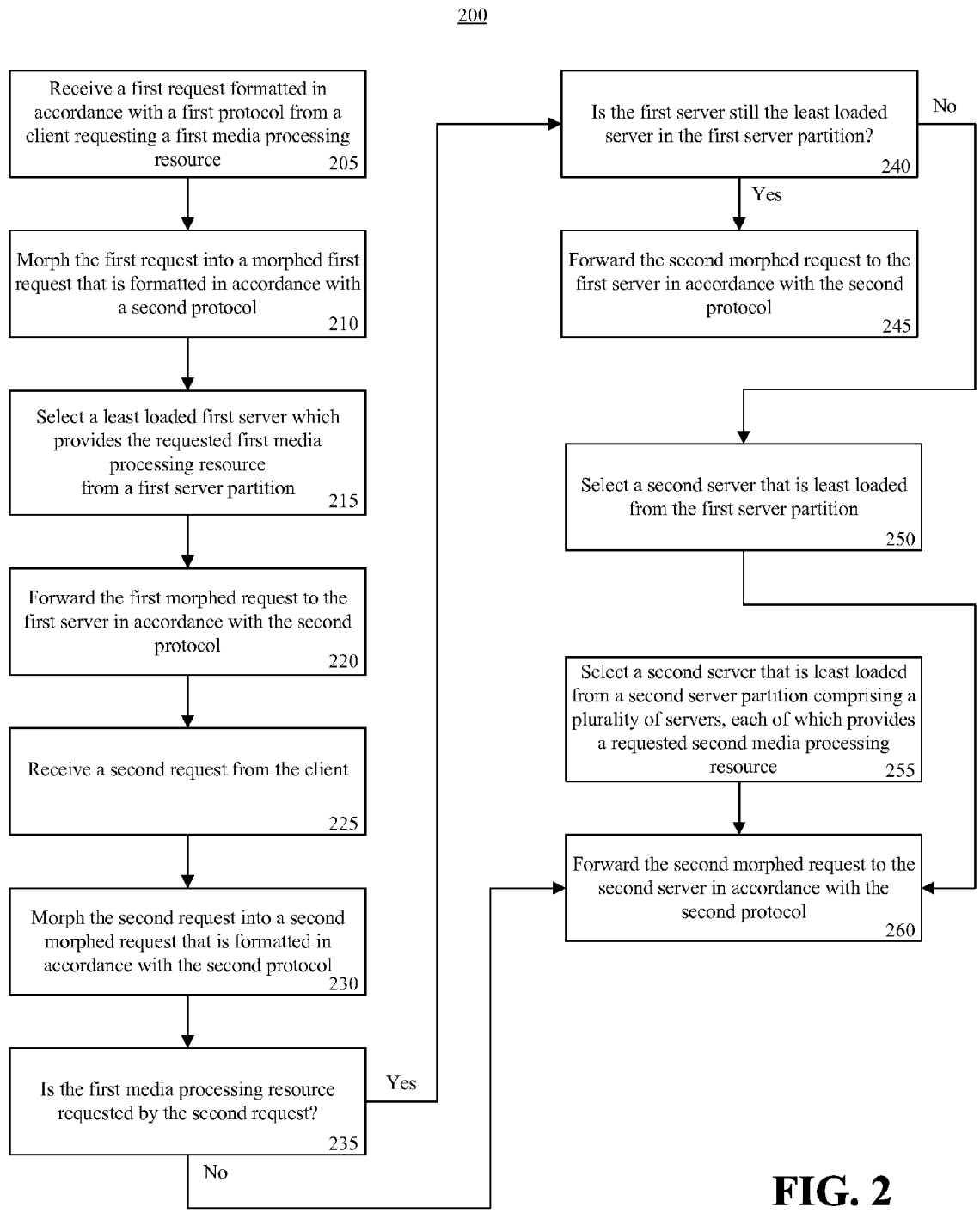
FIG. 2 is a flow chart illustrating a method of load balancing media processing resources in accordance with another embodiment of the present invention.

FIG. 2 is a flow chart illustrating a method 200 of load balancing media processing resources in accordance with another embodiment of the present invention. Beginning at step 205 a first request can be received from a client requesting a first media processing resource, the request being formatted in accordance with a first protocol. At step 210, the first request can be morphed into a first morphed request formatted in accordance with a second protocol. At step 215, a first server that is least loaded can be selected from a first server partition including a plurality of servers, each of which provides the requested first media processing resource. Proceeding to step 220, the first morphed request can be forwarded to the first server in accordance with the second protocol.

At step 225, a second request can be received from the client. The second request can be morphed into a second morphed request that is formatted in accordance with the second protocol, as shown in step 230. Referring to decision box 235, if the first media processing resource is requested by the second request, the method can continue to decision box 240. If the first server is still the least loaded server in the first partition, the second morphed request can be forwarded to the first server in accordance with the second protocol, as shown in step 245. If, however, the first server is not still the least loaded server, a second server that is least loaded can be selected from the second partition, as shown in step 250. Proceeding to step 260 the second morphed request can be sent to the second server in accordance with the second protocol.

Referring again to decision box 235 and to step 255, if the first media processing resource is not selected by the second request, a second server that is least loaded can be selected from a second server partition comprising a plurality of servers, each of which provides a requested second multimedia processing resource. Referring again to step 260, the second morphed request can be forwarded to the second server in accordance with the second protocol.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of load balancing media resources among a plurality of servers, the method comprising:
   receiving a first request from a client device requesting a first media processing resource, the first request formatted in accordance with a Media Resource Control Protocol (MRCP);
   morphing the first request by translating the first request into a first morphed request formatted in accordance with a Hypertext Transfer Protocol (HTTP) by replacing a Real Time Streaming Protocol (RTSP) portion of the first request with HTTP specific code;
   identifying a first server partition comprising a plurality of servers, each of which provides the requested first media processing resource;
   from the first server partition, selecting a first server that is least loaded; and
   forwarding the first morphed request to the first server in accordance with the HTTP.

2. The method of claim 1, further comprising:
   receiving a second request from the client formatted with the MRCP requesting the first media processing resource;
   morphing the second request by translating the second request into a second morphed request formatted in accordance with the HTTP by replacing a RTSP portion of the second request with HTTP specific code;
   if the first server is still least loaded, forwarding the second morphed request to the first server in accordance with the HTTP; and if the first server is not still least loaded, from the first server partition selecting a second server that is least loaded, and forwarding the second morphed request to the second server in accordance with the HTTP.

3. The method of claim 1, further comprising:
receiving a second request from the client formatted in accordance with the MRCP requesting a second media processing resource;
morphing the second request by translating the second request into a second morphed request formatted in accordance with the HTTP by replacing a RTSP portion of the second request with HTTP specific code;
from a second server partition comprising a plurality of servers, each of which provides the requested second media processing resource, selecting a second server that is least loaded; and
forwarding the second morphed request to the second server in accordance with the HTTP.

4. The method of claim 1, wherein said step of selecting the first server that is least loaded comprises:
applying resource selection rules to at least one pattern contained in a message component to identify the requested media processing resource, the message component selected from the group consisting of a uniform resource identifier (URI) and a content-type header; and
referencing at least one partition identifier to identify the server partition comprising the servers providing the requested media processing resource from a plurality of server partitions providing different media processing resources.

5. The method of claim 1, wherein said step of forwarding the first morphed request comprises selecting a media servlet on the first server that is associated with the media processing resource.

6. The method of claim 5, further comprising an intermediary system establishing a client session with the media servlet on behalf of the client device.

7. The method of claim 6, further comprising supporting the client session by passively allowing cookies to bypass load balancing routing.

8. A computer readable storage device having instructions stored thereon, which when executed by a processor, causes the processor to perform a method comprising:
receiving a first request from a client device requesting a first media processing resource, the first request formatted in accordance with a Media Resource Control Protocol (MRCP);
morphing the first request by translating the first request into a first morphed request formatted in accordance with a Hypertext Transfer Protocol (HTTP) by replacing a Real Time Streaming Protocol (RTSP) portion of the first request with HTTP specific code;
identifying a first server partition comprising a plurality of servers, each of which provides the requested first media processing resource;
from the first server partition, selecting a first server that is least loaded; and
forwarding the first morphed request to the first server in accordance with the HTTP.

9. The computer readable storage medium of claim 8, further comprising:
receiving a second request from the client formatted with the MRCP requesting the first media processing resource;
morphing the second request by translating the second request into a second morphed request formatted in accordance with the HTTP by replacing a RTSP portion of the second request with HTTP specific code;
determining whether the first server is still least loaded;
if the first server is still least loaded, forwarding the second morphed request to the first server in accordance with HTTP; and
if the first server is not still least loaded, from the first server partition selecting a second server that is least loaded, and forwarding the second morphed request to the second server in accordance with the HTTP.

10. The computer readable storage medium of claim 8, further comprising:
receiving a second request from the client formatted in accordance with the MRCP requesting a second media processing resource;
morphing the second request by translating the second request into a second morphed request formatted in accordance with the HTTP by replacing a RTSP portion of the second request with HTTP specific code;
selecting a second server that is least loaded from a second server partition comprising a plurality of servers, each of which provides the requested second media processing resource; and
forwarding the second morphed request to the second server in accordance with the HTTP.

11. The computer readable storage medium of claim 8, wherein said selecting the first server that is least loaded further comprises:
applying resource selection rules to at least one pattern contained in a message component to identify the requested media processing resource, the message component selected from the group consisting of a uniform resource identifier (URI) and a content-type header; and
referencing at least one partition identifier to identify the server partition comprising the servers providing the requested media processing resource from a plurality of server partitions providing different media processing resources.

12. The computer readable storage medium of claim 8, wherein said forwarding the morphed request further comprises:
selecting a media servlet on the first server that is associated with the media processing resource; and
an intermediary system establishing a client session with the media servlet on behalf of the client device, wherein the client session is supported by passively allowing cookies to bypass load balancing routing.

13. A system for load balancing media resources among a plurality of servers, the system comprising:
a processor
a protocol morpher executable by the processor that:
receives a first request from a client device requesting a first media processing resource, the first request formatted in accordance with a Media Resource Control Protocol (MRCP); and
morphs the first request by translating the first-request into a first morphed request formatted in accordance with a Hypertext Transfer Protocol (HTTP) by replacing a Real Time Streaming Protocol (RTSP) portion of the first request with HTTP specific code; and
a load balancer executable by the processor that:
identifies a first server partition comprising a plurality of servers, each of which provides the requested first media processing resource;
from the first server partition, selects a first server that is least loaded; and forwards the first morphed request to the first server in accordance with the HTTP.

14. The system of claim 13, wherein:

the protocol morpher receives a second request formatted in accordance with the MRCP from the client requesting the first media processing resource, and morphs the second request into a second morphed request formatted in accordance with the HTTP by replacing a RTSP portion of the second request with HTTP specific code; and the load balancer determines whether the first server is still least loaded and, if the first server is still least loaded, forwards the second morphed request to the first server in accordance with the HTTP, and, if the first server is not still least loaded, from the first server partition selects a second server that is least loaded, and forwards the second morphed request to the second server in accordance with the HTTP.

15. The system of claim 13 wherein:

the protocol morpher receives a second request formatted in accordance with the MRCP from the client requesting a second media processing resource, and morphs the second request by translating the second request into a second morphed request formatted in accordance with the HTTP by replacing a RTSP portion of the second request with HTTP specific code; and the load balancer selects a second server that is least loaded from a second server partition comprising a plurality of servers, each of which provides the requested second media processing resource, and forwards the second morphed request to the second server in accordance with the HTTP.

16. The system of claim 13, wherein the load balancer applies resource selection rules to at least one pattern contained in a message component to identify the requested media processing resource, the message component selected from the group consisting of a uniform resource identifier (URI) and a content-type header, and references at least one partition identifier to identify the server partition comprising the servers providing the requested media processing resource from a plurality of server partitions providing different media processing resources.

17. The system of claim 13, wherein the load balancer selects a media servlet on the first server that is associated with the media processing resource and establishes a client session with the media servlet, wherein a client session is created between the protocol morpher and the media servlet by the load balancer passively allowing cookies to pass between the media server and the protocol morpher.

18. The method of claim 1, wherein replacing the RTSP portion of the first request with the HTTP specific code comprises:

replacing a line of code of the first request comprising the terms "ANNOUNCE rtsp" with the HTTP specific code.

19. The method of claim 1, wherein said step of morphing the first request further comprises:

replacing a line of code comprising the term "SPEAK" in an MRCP portion of the first request with a line of code comprising the terms "MRCPMethod: Speak".

20. The method of claim 19, further comprising:

removing from the RTSP portion of the first request a line of code comprising the term "Content-Type" and a line of code comprising the term "Content-Length".

* * * * *